H. A. KRICKE.
VACUUM CONTROL VALVE FOR MILKING APPARATUS.
APPLICATION FILED MAY 7, 1914. RENEWED APR. 10, 1916.
1,204,458.
Patented Nov. 14, 1916.
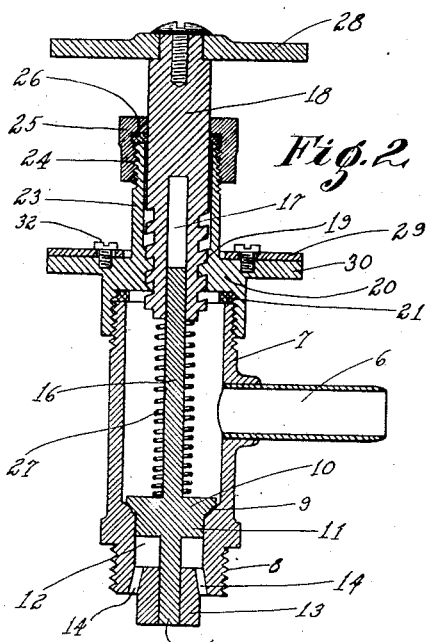
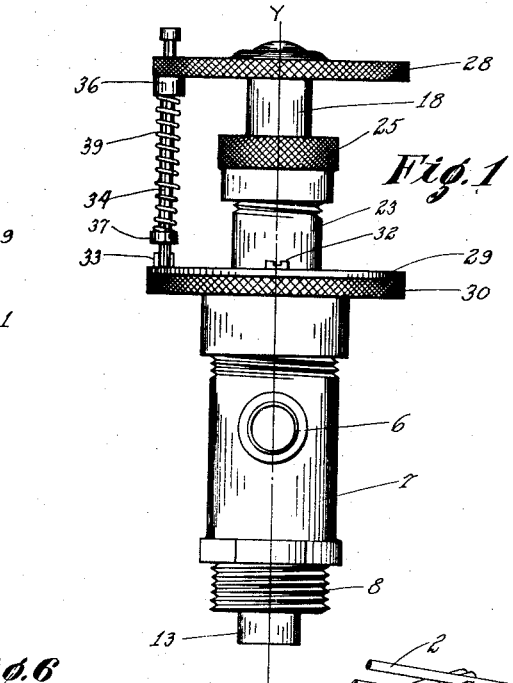
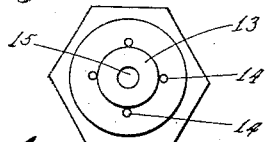
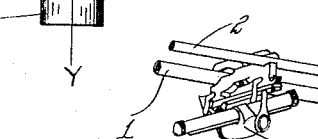
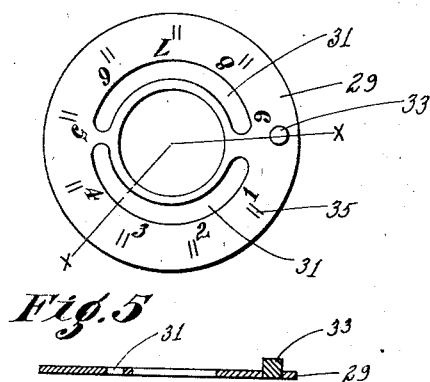
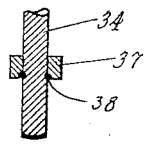
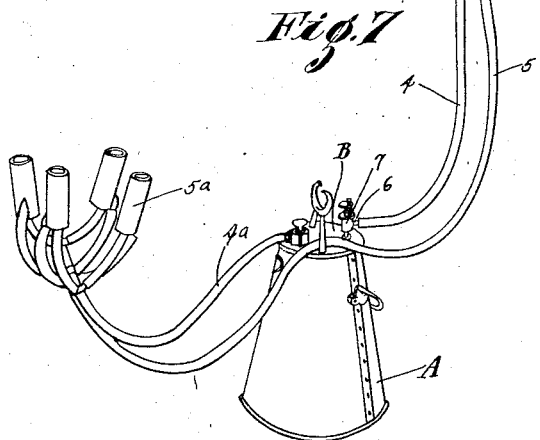
WITNESSES:
J. B. Webster
F. M. Blanchard
INVENTOR.
Herman A. Kricke
BY
Percy Webster
ATTORNEY

UNITED STATES PATENT OFFICE.

HERMAN A. KRICKE, OF CROWS LANDING, CALIFORNIA.

VACUUM-CONTROL VALVE FOR MILKING APPARATUS.

1,204,458.   Specification of Letters Patent.   Patented Nov. 14, 1916.

Application filed May 7, 1914, Serial No. 836,963. Renewed April 10, 1916. Serial No. 90,281.

*To all whom it may concern:*

Be it known that I, HERMAN A. KRICKE, a citizen of the United States, residing at Crows Landing, in the county of Stanislaus and State of California, have invented certain new and useful Improvements in Vacuum-Control Valves for Milking Apparatus; and I do declare the following to be a clear, full, and exact description of the same, reference being had to the accompanying drawings, and to the characters of reference marked thereon, which form a part of this application.

This invention relates to improvements in milking apparatus and particularly to that type of mechanical milking apparatus commonly known as the pulsating pressure and vacuum type in which the teat cups are operated by pulsating pressure and the milk withdrawn by vacuum suction maintained in the milk receiving receptacle.

My improved structure embodies a control valve for the vacuum in the milk receiving receptacle thereby increasing the efficiency and practicability of the above type of mechanical milker. From experience in the use of such milkers as are at present used, I find that some means of control of the vacuum in the milk receiving receptacle is greatly to be desired for the reason that where a constant vacuum is maintained in the milk can, the same conditions are therefore prevalent for milking each and every cow. From experiment and contact with many cows, I have found this condition harmful in some instances as, for example, the suction becomes at times too great for certain cows thus forming strictures in the milk ducts with a consequent swelling and injury to the udder of the cow. With the use of my improved control valve however, the suction can be raised or lowered as found most desirable in the milking of different cows thus obviating the objections noted above.

The above result is obtained by means of such structure and relative arrangement of the parts as will fully appear by a perusal of the following specification and claims.

On the drawings, similar characters of reference indicate corresponding parts in the several views.

Figure 1 is a side elevation of my improved control valve. Fig. 2 is a sectional view taken on a line Y—Y of Fig. 1. Fig. 3 is a plan view of the bottom of my improved valve. Fig. 4 is a top plan view of an indicating dial. Fig. 5 is a sectional view taken on a line X—X of Fig. 4. Fig. 6 is a fragmentary view in section of an indicating pin. Fig. 7 is a perspective view showing the application of the device to the milking apparatus.

As has been pointed out above, I, in this application, make no specific claim to the structure of the milking apparatus itself, hence will not overburden the application with a detailed description of the structure and operation of the milking apparatus *per se*, but merely refer to the same briefly in order that the application of my improved control valve may be thoroughly understood.

Referring now more particularly to the characters of reference on the drawings with special reference to Fig. 7, the numeral 1 designates the suction or vacuum lead pipe connected with the pulsator 3, while the numeral 2 designates the pressure lead pipe connecting with the pulsator 3. The numeral 5 designates the pressure pipe leading from the pulsator 3 to the teat cups 5ª, and the numeral 4 designates the suction pipe leading from the milk receiving receptacle "A" to the pulsator 3 whereby the vacuum is created in the receptacle "A", whereby with the operation of teat cups 5ª, the milk will be sucked through the pipe 4ª from said teat cups into the receptacle "A."

The above is the already commonly used type of milking apparatus, such as that shown in the patent to Sharples, dated January 16th, 1912, No. 1,014,671, and my improved structure consists in placing a control between the receptacle "A" and the pipe 4 whereby the suction from the pipe 4 may be increased or diminished to increase or diminish the vacuum in the receptacle "A" so that the suction through the pipe 4ª will be exactly proper to merely draw the milk away from the different cows without sucking or drawing on the milk ducts of the cow in such a manner as to cause the trouble noted in the preamble to this specification. To this end I place a pressure controlled valve at the juncture of the pipe 4 with the receptacle "A," the pressure control of which valve may be readily adjusted to fit conditions for different cows and this valve and adjustment structure is as follows, namely: The valve proper comprises a casing 7 provided with a nipple 6, to which nipple 6 the pipe 4 is connected in any suitable manner. Said casing 7 is provided with threads 8 at its lower end by means of which it may be screwed or otherwise secured into the lid "B" of the receptacle "A." Formed in the casing 7 is a seat 9 against which normally seats a valve 10 having a projecting portion 11 movable in a lower neck 12 of the casing 7 below the seat 9, there being a centrally orificed guide collar 13 disposed on the lower end of the casing 7, such casing being provided with openings 14 in its lower end around said guide collar 13 to permit of the passage of air from the receptacle "A" through the casing 7 and into the pipe 4.

The valve 10 is provided with a lower stem 15 guided through the guide collar 13 and with an upper stem 16 guided into a central orifice 17 in an adjustment pin 18 which is screw mounted as at 19 through a cap 20. This cap 20 is screw mounted on the upper end of the casing 7 with a washer 21 interposed between the cap 20 and the casing 7 to make a tight non-leakable joint. A further security against leakage is obtained by means of a sleeve 23 on the cap 20, which sleeve is disposed around the member 18 and is threaded at its upper end as at 24 to receive a cap 25 mounted in close relation around the member 18 with a washer 26 interposed between the cap 25 and the top of the sleeve 23 and closely around the member 18.

Interposed between the valve 10 and the lower end of the member 18 within the casing 7 is a controlling spring 27 which normally holds the valve 10 seated on the seat 9 to close communication between the receptacle "A" and the suction pipe 4. Thus to create the necessary vacuum in the receptacle "A", the suction through the pipe 4 lifts the valve 10. The ease with which this lifting operation can be accomplished is determined by the spring 27 and hence to get a greater vacuum in the receptacle "A", the tension of the spring 27 should be less and to get a lesser vacuum in the receptacle "A", the tension of the spring 27 must be increased. My improved valve structure therefore provides for turning the member 18 to lessen or increase the tension of the spring 27 and also to proportion this lessened or increased tension accurately so as to proportionately increase or lessen the vacuum by a certain number of pounds and this operation is accomplished by means of the following structure and adjustments, namely:

On the upper end of the pin 18 is a knurled operating disk 28 by means of the operation of which the pin 18 may be turned to move against the spring 27 to increase its tension or to move away from the spring 27 to lessen its tension. The spring 27 and the movement of the pin 18 are so proportioned that with the movement of the member 18, a portion of a turn, the tension of the spring 27 will be controlled to increase or lessen the vacuum in the receptable "A" by one, two, three or more pounds and this adjustment is accomplished by means of a dial 29 secured to a plate 30 on the upper end of the cap 20. This dial 29 is provided with annular slots 31 and the dial 29 is secured to the member 30 by means of screws 32 projecting through the slots 31 and into the member 30. By reason of these slots 31, the dial 29 may be set at such a point on the member 30 that its starting lug or point 33 will be in such position that when the indicating pin 34, carried by the member 28, is against such lug 33, then the pin 18 will be in such position as will allow the spring 27 to be at its highest expansion whereby the maximum vacuum will be prevalent in the receptacle "A". The dial 29 is then provided with a plurality of spaced points 35, each one being indicated by a numeral 1, 2, 3, etc. Each of these points 35 is so spaced that with the turning of the member 28 to bring the member 34 into register with one of said points 35, this is a sufficient movement to cause the pin 18 to advance against the spring 27 to such a degree as to increase its tension to cause the suction against the valve 10 to be reduced to such a degree as to reduce the vacuum in the receptacle "A" to a fixed degree such as one pound or other amount as may be desired so that a determined vacuum may be had to give a desired suction from the teat cups 5ª for different cows, all of which would be determined by the operator and a record kept so that the apparatus could be quickly adjusted with the change from one cow to another. The indicating pin 34, as has been stated, is mounted through the member 28 to move therewith and in order to permit of its efficient operation it is slidable through a collar 36 on the underside of the member 28 and through the member 28 as shown clearly in Fig. 1, and near its lower end is provided with a collar 37. This collar 37 is secured to the pin 34 by means of a small wire ring 38 projecting partly into the collar 37 and partly through the pin 34 to form a lock for the collar 37 to the member 34. A spring 39 is interposed between the collar 36 and the collar 37 to hold the pin 34 in frictional contact with the dial 29 and the points 35 are formed as small recesses to receive the lower end of the pin 34 to prevent the device moving at undesired times, the spring 39 holding such pin 34 in such recesses until the operator moves the member 28.

The projecting portion 11 moving in the neck 12 causes an extended upward movement against the spring 7 before there is any communication opened between the receptacle "A" and the pipe 4 and this therefore permits of a more accurate adjustment of the spring 27 to obtain the results desired than would be possible if the valve 10 merely seated on the seat 9 without this extension.

From the foregoing description it can readily be seen that the amount of suction between the pipe 4 and the receptacle "A" can be adjusted to a nicety so as to control the vacuum in the receptacle "A" to cause the suction through the pipe 4ᵃ from the teat cups 5ᵃ to be more or less according to the different conditions of different cows upon which the apparatus might be used.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention as defined by the appended claims.

Having thus described my invention what I claim as new and useful and desire to secure by Letters Patent is:—

1. The combination with a milking apparatus having a milk receiving receptacle and suction pipes leading to and from such receptacle, of a control valve interposed between said receptacle and the suction pipe leading thereinto, said control valve comprising a casing having an inlet and an outlet, such inlet being provided with a valve seat, a spring pressed valve normally mounted on said seat and a projecting portion on said valve extending into said inlet whereby said valve must make an extended movement before said inlet is open as and for the purpose described.

2. A device of the character described comprising the combination with a milking apparatus having a milk receiving receptacle and suction pipes leading to and from such receptacle, of a control valve interposed between said receptacle and the suction pipe leading thereinto, said control valve comprising a casing having an inlet and an outlet, a spring pressed valve forming a normal closure for said inlet, an adjustment pin for controlling the tension of said spring pressed valve, and means for gaging the movement of said adjustment pin, such means comprising a dial adjustably mounted on said casing, a stop member on said dial at a predetermined point, said dial being provided with indicating points, and an indicating member on said adjustment pin movable over said dial, as described.

3. The combination with a milking apparatus having a milk receiving receptacle and suction pipes leading to and from such receptacle, of a control valve interposed between said receptacle and the suction pipe leading thereinto, said control valve comprising a casing having an inlet and an outlet, a spring pressed valve forming a normal closure for said inlet, an adjustment pin for controlling the tension on said spring pressed valve, and means for gaging the movement of said adjustment pin, such means comprising a plate on said casing, a dial provided with annular slots, set screws adapted to project through said slots and into said plate, a lug on said dial, said dial being provided with indicating points, and an indicating member on said adjustment pin movable over said dial, as described.

In testimony whereof I affix my signature in presence of two witnesses.

HERMAN A. KRICKE.

Witnesses:
 H. F. W. C. MEIER,
 G. W. WHITEHURST.